United States Patent
Tsujita et al.

(10) Patent No.: US 6,665,757 B1
(45) Date of Patent: Dec. 16, 2003

(54) COMMUNICATION INTERFACE HAVING A MASTER ACTIVATING/DEACTIVATING A FIRST SIGNAL WITH A CLOCK SIGNAL AFTER A PREDETERMINED TIME AFTER A SLAVE ACTIVATING/DEACTIVATING THE FIRST SIGNAL

(75) Inventors: Shoichi Tsujita, Kyoto (JP); Masaru Fujii, Shiga (JP); Tatsuhiro Hosokawa, Osaka (JP); Tsutomu Sekibe, Osaka (JP); Hiroshi Sakurai, Osaka (JP); Hideki Kawai, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/545,279

(22) Filed: Apr. 7, 2000

(30) Foreign Application Priority Data

Apr. 8, 1999 (JP) ............................................ 11-101066

(51) Int. Cl.$^7$ ............................................... G06F 13/42
(52) U.S. Cl. ........................ 710/110; 710/105; 710/305
(58) Field of Search ........................ 710/105–110, 113, 710/36, 305, 313–315; 375/354, 356; 713/400, 500, 600

(56) References Cited

U.S. PATENT DOCUMENTS

| | | | | |
|---|---|---|---|---|
| 4,872,003 A | * | 10/1989 | Yoshida | 340/825.21 |
| 5,142,594 A | * | 8/1992 | Sugishima | 358/409 |
| 5,150,412 A | * | 9/1992 | Maru | 380/247 |
| 5,600,803 A | * | 2/1997 | Iitsuka et al. | 709/208 |
| 5,758,098 A | * | 5/1998 | Townsley et al. | 710/110 |
| 5,925,133 A | * | 7/1999 | Buxton et al. | 713/323 |
| 5,951,666 A | * | 9/1999 | Ilting et al. | 710/71 |
| 6,253,259 B1 | * | 6/2001 | Hirabayashi et al. | 709/217 |
| 6,434,650 B1 | * | 8/2002 | Morris et al. | 710/107 |
| 6,434,654 B1 | * | 8/2002 | Story et al. | 710/307 |
| 6,446,154 B1 | * | 9/2002 | Ajanovic et al. | 370/420 |

FOREIGN PATENT DOCUMENTS

JP        63-58567        *   3/1988

* cited by examiner

*Primary Examiner*—Ilwoo Park
(74) *Attorney, Agent, or Firm*—Snell & Wilmer, LLP

(57) ABSTRACT

A communication interface of the present invention includes a clock signal line, a first signal line, a second signal line and one or more data signal lines as communication signal lines between a master system and a slave system.

4 Claims, 13 Drawing Sheets

| Number | Name of signal line | Function |
|---|---|---|
| 1 | CLK | Clock signal line |
| 2 | BC | Bus control signal line |
| 3 | I/O 0~3 | Data input/output signal lines |
| 4 | CD/RST | Slave detection/reset signal line |

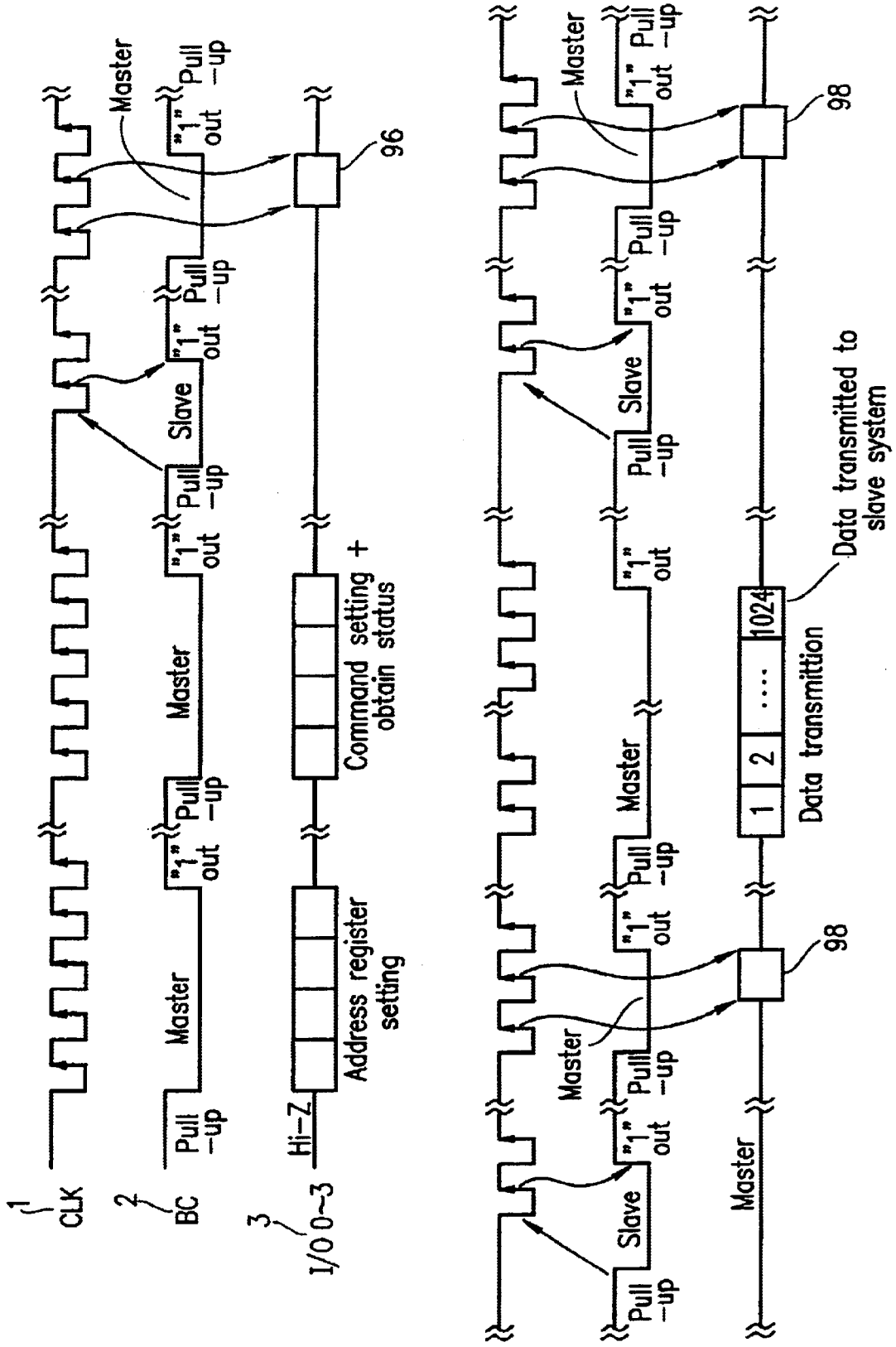

FIG. 8

(a) Command status (COS)

| Status | Status description | I/03 | I/02 | I/01 | I/00 |
|---|---|---|---|---|---|
| OK | Command reception OK | 0 | 0 | 0 | 0 |
| NG | Command error | 0 | 0 | 0 | 1 |

(b) Slave status (SLS)

| Status | Status description | I/03 | I/02 | I/01 | I/00 |
|---|---|---|---|---|---|
| Ready | Slave ready (idling) | 0 | 0 | 0 | 0 |
| Stand by | Slave stand-by | 0 | 0 | 1 | 0 |
| NG | Slave error | 0 | 0 | 0 | 1 |

(c) Execution status (EXS)

| Status | Status description | I/03 | I/02 | I/01 | I/00 |
|---|---|---|---|---|---|
| OK | Execution successful | 0 | 0 | 0 | 0 |
| NG | Execution error | 0 | 0 | 0 | 1 |
| TIME-OVER | Process time over | 0 | 0 | 1 | 1 |
| MEMORY-FULL | Memory area over | 0 | 1 | 0 | 1 |
| ECC-ERROR | ECC error | 1 | 0 | 0 | 1 |
| DATA-REQUEST | Sector data transmission request | 0 | 0 | 1 | 0 |

FIG. 9

| Command | Command description | Resistor address 0 | Resistor address 1 | Data | Command status | Slave status | Execution status |
|---|---|---|---|---|---|---|---|
| Set Sector Count | Set number of read/write blocks | 0h | 2h | Sector Count | No | No | No |
| Set LBA7-0 | Set LBA7-0 | 0h | 3h | LBA7-0 | No | No | No |
| Set LBA15-8 | Set LBA15-8 | 0h | 4h | LBA15-8 | No | No | No |
| Set LBA23-16 | Set LBA23-16 | 0h | 5h | LBA23-16 | No | No | No |
| Set LBA31-24 | Set LBA31-24 | 0h | 6h | "111X"+LBA27-24 | No | No | No |
| Read Sector Count | Obtain number of read/write blocks | 1h | 2h | Don't care | COS | No | EXS |
| Read LBA7-0 | Obtain LBA7-0 | 1h | 3h | Don't care | COS | No | EXS |
| Read LBA15-8 | Obtain LBA15-8 | 1h | 4h | Don't care | COS | No | EXS |
| Read LBA23-16 | Obtain LBA23-16 | 1h | 5h | Don't care | COS | No | EXS |
| Read LBA31-24 | Obtain LBA31-24 | 1h | 6h | Don't care | COS | No | EXS |
| Read Status | Obtain status register | 1h | 7h | Don't care | COS | SLS | No |
| Execute Drive Diagnostic | Execute read/write test | 0h | 7h | 90h | COS | No | EXS |
| Identify Drive | Obtain parameter information | 0h | 7h | ECh | COS | No | EXS |
| Read Sector(s) | Read block(s) | 0h | 7h | 20h or 21h | COS | No | EXS |
| Write Sector(s) | Write block(s) | 0h | 7h | 30h or 31h | COS | No | EXS |
| Write Sector(s) w/o Erase | Write block(s) (w/o erase) | 0h | 7h | 38h | COS | No | EXS |
| Erase Sector(s) | Erase block(s) | 0h | 7h | C0h | COS | No | EXS |
| Read Buffer | Read sector buffer | 0h | 7h | E4h | COS | No | EXS |
| Write Buffer | Write sector buffer | 0h | 7h | E8h | COS | No | EXS |
| Stand-by Immediate | Transition to stand-by mode | 0h | 7h | 94h or E0h | COS | SLS | No |
| Idle Immediate | Return to ready state | 0h | 7h | 95h or E1h | COS | SLS | No |

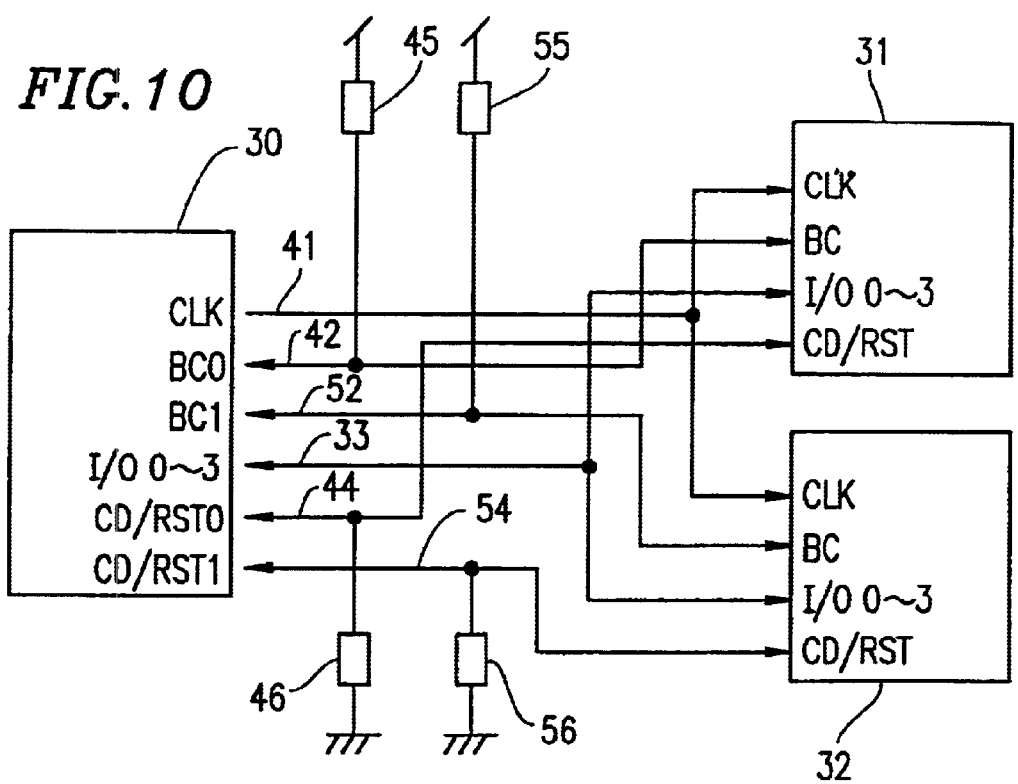

FIG.13

| Number | Name of signal line | Function |
|---|---|---|
| 101 | A00<br>A01<br>A02<br>A03<br>A04<br>A05<br>A06<br>A07<br>A08<br>A09<br>A10 | Address input signal lines |
| 102 | D00<br>D01<br>D02<br>D03<br>D04<br>D05<br>D06<br>D07<br>D08<br>D09<br>D10<br>D11<br>D12<br>D13<br>D14<br>D15 | Data/command/status information input/output signal lines |
| 103 | −CE | Slave system selection signal line |
| 105 | −IREQ | Slave system internal operation state signal line |
| 106 | −IOWR | Write control signal line |
| 107 | −IORD | Read control signal line |

FIG.15

| Number | Number of signal line | Function |
|---|---|---|
| 111 | −CS | Slave system selection signal line |
| 112 | CLK | Clock signal line |
| 113 | Data In | Data input signal line |
| 114 | Data Out | Data output signal line |

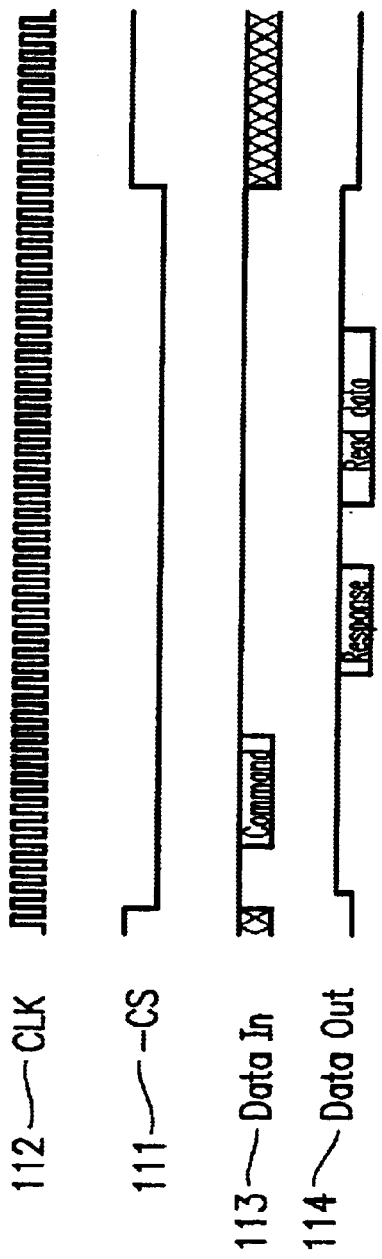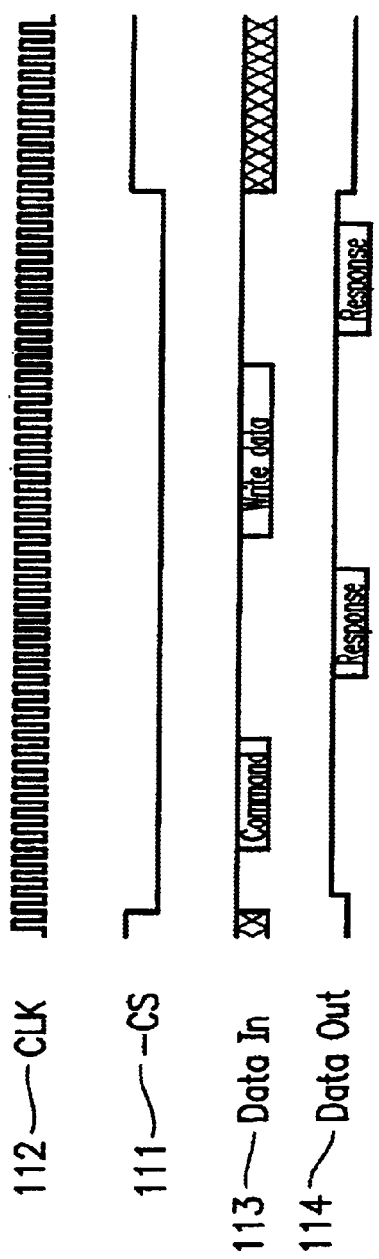

US 6,665,757 B1

COMMUNICATION INTERFACE HAVING A MASTER ACTIVATING/DEACTIVATING A FIRST SIGNAL WITH A CLOCK SIGNAL AFTER A PREDETERMINED TIME AFTER A SLAVE ACTIVATING/DEACTIVATING THE FIRST SIGNAL

BACKGROUND OF THE INVENTION

1. Field of the Invention

The present invention relates to a communication Interface between a single system serving as a master (hereinafter, referred to as a "master system") and a plurality of systems serving as slaves (hereinafter, referred to as "slave systems").

2. Description of the Related Art

Various communication interfaces have been proposed and standardized in the art for communicating a plurality of systems with one another. Examples of such conventional communication interfaces used between a master system and one or more slave systems will now be described.

As a first conventional example, a conventional PC card ATA I/O mode interface will be described below.

FIG. 13 illustrates signal lines included in a conventional PC card ATA I/O mode interface. Referring to FIG. 13, the conventional PC card ATA I/O mode interface includes: signal lines 101 ("A00"–"A10") through which an address is input by designating one of addresses A00–A10 in a slave system to be accessed by a master system; data input/output signal lines 102 ("D00"–"D15") for data/command/status information; a signal line 103 ("-CE") through which the master system selects one of a plurality of slave systems: a signal line 105 ("-IREQ") through which the master system is notified of the internal operation state of the slave system: a write control signal line 106 ("-IOWR") through which the master system controls outputs from the master system to the signal lines 102 and inputs to the slave system; and a read control signal line 107 ("-IORD") through which the master system controls outputs from the slave system to the signal lines 102 and inputs to the master system.

A basic operation, i.e., a read/write operation, of a conventional communication system including these signal lines connected between the master system and the slave systems will now be described.

Each of FIGS. 14A and 14B is a timing diagram illustrating a communication protocol for use in the conventional PC card ATA I/O mode interface.

FIG. 14A illustrates a conventional method by which the signal lines are operated when the master system reads data from a slave system. The master system controls the slave system selection signal line 103 to go low so as to select one of the slave systems with which the master system is to communicate. Then, the master system transmits a register address in the slave system at which a read address is to be stored and the read address to the address signal lines 101 and the data input/output signal lines 102, respectively. At the same time, the master system controls the write control signal line 106, through which inputs to the slave system are controlled, to go low. The write control signal line 106 is kept low for a predetermined period and is then controlled to go high, thereby setting the address register in the slave system, which indicates the address from which data is to be read out. The address of the data to be read out is designated by repeating this operation of setting the address register in the slave system using the address signal lines 101, the data input/output signal lines 102 and the write control signal line 106. Then, the register address in the slave system for storing the command address and prescribed data, which indicates a read command, is transmitted to the address signal lines 101 and the data input/output signal lines 102, respectively, in order to issue a read command to the slave system. At the same time, the write control signal line 106, through which inputs to the slave system are controlled, is kept low for a predetermined period and is then controlled to go high, whereby the slave system interprets the data received from the data input/output signal lines 102 in order to determine whether a read request has been issued from the master system, thereby starting to read data from a memory device in the slave system. Thereafter, when the read data is ready, the slave system controls the signal line 105, which indicates the internal state of the slave system, to go low. The master system detects the high-to-low transition of the signal line 105, which indicates the internal state of the slave system, after which the master system transmits the address of the status register of the slave system to the address signal lines 101. At the same time, the master system controls the read control signal line 107, through which outputs from the slave system are controlled, to go low. The master system keeps the read control signal line 107 low for a predetermined period and then controls the read control signal line 107 to go high, thereby receiving the status of the slave system through the data input/output signal lines 102. Thereafter, the master system transmits the address of the data register of the slave system to the address signal lines 101. At the same time, the master system controls the read control signal line 107, through which outputs from the slave system are controlled, to go low. The master system keeps the read control signal line 107 low for a predetermined period and then controls the read control signal line 107 to go high. Thus, the operation of receiving the read data through the data input/output signal lines 102 is repeated so that the master system receives data having a particular data length from the slave system.

FIG. 14B illustrates a conventional method by which the signal lines are operated when the master system writes data to a slave system. Setting of an address register which indicates the address at which data is to be written is performed by a manner similar to that illustrated in FIG. 14A. Then, the register address in the slave system for storing the command address and prescribed data which Indicates a write command is transmitted to the address signal lines 101 and the data input/output signal lines 102 respectively, in order to issue a write command to the slave system. At the same time, the write control signal line 106, through which inputs to the slave system are controlled, is kept low for a predetermined period and is then controlled to go high, whereby the slave system interprets the data received from the data input/output signal lines 102 in order to determine whether a write request has been issued from the master system, and the slave system waits for write data. Then, the master system transmits the address of the data register of the slave system to the address signal lines 101. At the same time, the write control signal line 106, through which inputs to the slave system are controlled, is kept low for a predetermined period and is then controlled to go high. Thus, the operation of transmitting the write data through the data input/output signal lines 102 is repeated so that the master system transmits data having a particular data length to the slave system. When the transmission is complete, the slave system writes write data in a memory device in the slave system. When the write operation is complete, the signal line 105, which indicates the internal state of the slave system, is controlled to go low. The master system detects the high-to-low transition of the signal line 105, which indicates the internal state of the slave system, after which the master system transmits the address of the status register of the slate system to the address signal lines 101. At the same time the master system controls the read control signal line 107, through which output from the slave system are controlled to go low. The master system keeps the read control signal line 107 low for a predetermined period and then controls the read control signal line 107 to go high, thereby receiving the status of the slave system through the date input/output signal lines 102 in order to confirm completion of the operation.

As a second conventional example, a conventional microcontroller interface will be described below.

FIG. 15 illustrates signal lines Included in a conventional microcontroller interface. Referring to FIG. 15 the conventional microcontroller interface includes a slave system selection signal line 111 ("-CS"), a clock signal line 112 ("CLK") for synchronization of communicated data; a data input signal line 113 ("Data In") through which data is input from the master system to the slave system; and a data output signal line 114 ("Data Out") through which data is output from the slave system to the master system.

An operation of a communication system including these signal lines connected between the master system and the slave systems will now be described.

Each of FIGS. 16A and 16B is a timing diagram illustrating a communication protocol for use in the conventional microcontroller.

FIG. 16A is a timing diagram illustrating a conventional method by which the signal lines are operated when the master system of the conventional microcontroller reads data from a slave system. The master system controls the slave system selection signal line 111 to go low so as to select one of the slave systems with which the master system is to communicate. The master system transmits a read command having a predetermined data length to the data input signal line 113 in synchronism with the clock signal on the clock signal line 112. The data input signal line 113 is initially kept high. A high-to-low transition of the data input signal line 113 triggers the slave system to start receiving the command therefrom. During this operation, the slave system keeps the data output signal line 114 high, and interprets the command received from the master system, after which the slave system transmits command reception response data to the data output signal line 114 in synchronism with the clock signal on the clock signal line 112. First, the slave system controls the data output signal line 114 to go low, and then transmits response data having a predetermined data length, after which the slave system again keeps the data output signal line 114 high. On the other hand, the master system is triggered by a high-to-low transition of the data output signal line 114 to start receiving the data from the slave system. The master system receives as command reception response data the subsequent output data which has a predetermined data length. The master system continues to transmit a clock signal to the clock signal line 112 even after confirming a normal operation by receiving command reception response data from the slave system, thereby preparing to receive data transmitted by the slave system through the data output signal line 114. The master system is triggered by a high-to-low transition of the data output signal line 114 to receive the subsequent data as read data from the data output signal line 114 which has a predetermined data length.

FIG. 16B is a timing diagram illustrating a conventional method by which the signal lines are operated when the master system of the conventional microcontroller writes data to a slave system. The master system controls the slave system selection signal line 111 to go low so as to select one of the slave systems with which the master system is to communicate. The master system transmits a write command having a predetermined data length to the data input signal line 113 in synchronism with the clock signal on the clock signal line 112. The data input signal line 113 is initially kept high. A high-to-low transition of the data input signal line 113 triggers the slave system to start receiving data therefrom. During this operation, the slave system keeps the data output signal line 114 high, and interprets the command received from the master system, after which the slave system transmits command reception response data to the data output signal line 114 in synchronism with the clock signal an the clock signal line 112. First, the slave system controls the data output signal line 114 to go low, and then transmits response data having a predetermined data length, after which the slave system again keeps the data output signal line 114 high. On the other hand, the master system is triggered by a high-to-low transition of the data output signal line 114 to start receiving the data from the slave system. The master system receives as command reception response data the subsequent output data which has a predetermined data length. After confirming a normal operation by receiving command reception response data, the master system controls the data input signal line 113 to go low in synchronism with the clock signal on the data clock line 112 and transmits write data having a predetermined data length to the data input signal line 113. Finally, the master system controls the data input signal line 113 to go high. The slave system is triggered by a high-to-low transition of the data input signal line 113 to receive the write data and write the received data in a memory device. The slave system controls the data output signal line 114 to go low and transmits a write operation completion response through the data output signal line 114. The master system is triggered by a high-to-low transition of the signal received through the data output signal line 114 to receive the subsequent data as response data from the data output signal line 114 which has a predetermined data length, thereby confirming the write operation.

The communication interface of the first conventional example, which is defined as the ANSI ATA standard, is commonly used in communication between a personal computer and a PC card. As described above, the communication interface is characterized by the use of many signal lines such as the address/data/control signal lines, and has a specification which is designed to maintain a communication compatibility with existing personal computers. However, because of the use of many signal lines for communication, the communication interface is not suitable for a system in which a reduction in physical size is demanded.

The communication interface of the second conventional example, as described above, has only four signal lines, and is therefore suitable as a communication interface for use with small apparatuses. However in order to increase the data transfer rate, It is necessary to increase the number of data lines. In this conventional communication interface, Independent signal lines are used for input and output of data signals. For example, when such a system is designed with 4-bit data lines, a total of 8 data lines will be required, thereby significantly increasing the number of signal lines and making the communication interface less suitable for small systems.

SUMMARY OF THE INVENTION

According to one aspect of this invention, a communication interface includes a clock signal line, a first signal line, a second signal line and one or more data signal lines as communication signal lines between a master system and a slave system.

In one embodiment of the invention, the first signal line is used both for transmitting a signal from the master system to the slave system and for transmitting a signal from the slave system to the master system.

In one embodiment of the invention, the master system transmits a signal to the clock signal line only when the first signal line is activated by the master system or the slave system, and the master system stops transmitting the clock signal to the clock signal line when the first signal line is not activated.

In one embodiment of the invention, the second signal line is used both for transmitting an initialization signal from the master system to the slave system and for transmitting a detection signal from the slave system to the master system.

In one embodiment of the invention, the first signal line is connected to a first predetermined potential via a first resistor element, and the second signal line is connected a second predetermined potential via a second resistor element.

In one embodiment of the invention, the master system transmits a cloak signal to the clock signal line after the slave system has activated the first signal line. The master system stops transmitting the signal to the clock signal line after the slave system stops activation of the first signal line. After a predetermined period of time has passed after the master system has stopped transmitting the clock signal to the clock signal line, the master system activates the first signal line and transmits the clock signal to the clock signal line. The master system and the slave system communicate with each other via the data signal line in synchronism with the clock signal on the clock signal line. After the communication is completed, the master system stops activation of the first signal line while simultaneously stopping transmission of the clock signal to the clock signal line.

Based on the above-described configuration, it is possible to communicate the master system and the slave systems with each other with a minimum number of signal lines.

Thus, the invention described herein makes possible the advantage of providing a small communication interface used between a single master system and a plurality of slave systems, which is capable of communicating the master system and the slave systems with each other with a minimum number of signal lines.

This and other advantages of the present invention will become apparent to those skilled in the art upon reading and understanding the following detailed description with reference to the accompanying figures.

BRIEF DESCRIPTION OF THE DRAWINGS

FIG. 7 is a timing diagram illustrating a communication protocol for use in a write operation according to Embodiment 1 of the present invention;

FIG. 8 illustrates slave system status definitions according to Embodiment 1 of the present invention;

FIG. 9 illustrates command definitions according to Embodiment 1 of the present invention:

FIG. 10 is a block diagram illustrating an exemplary interface connection between the master system and a plurality of slave systems according to Embodiment 2 of the present invention;

FIG. 13 illustrates signal lines included in a conventional PC card ATA I/O mode interface;

Figure 14A:
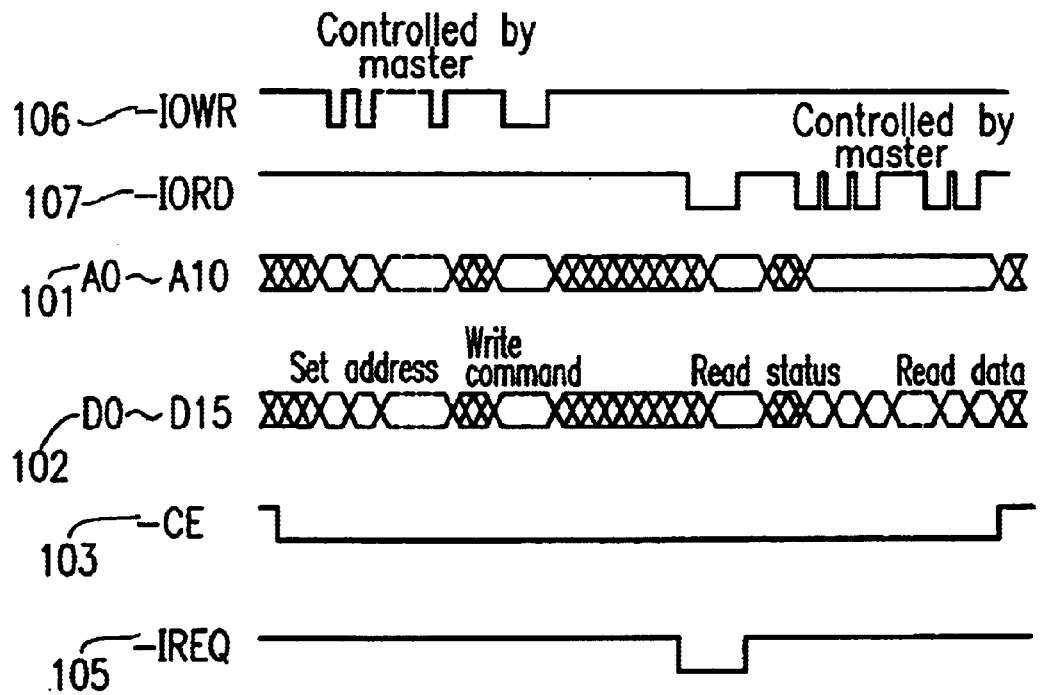
Figure 14B:
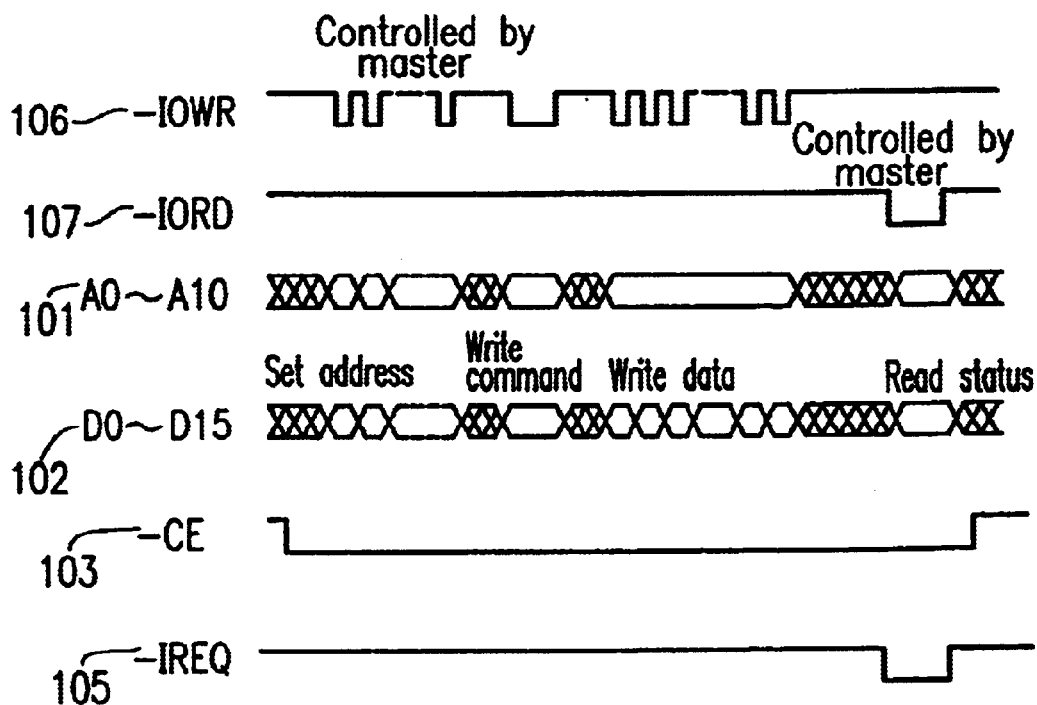

Each of FIGS. 14A and 14B is a timing diagram illustrating a a communication protocol for use in the conventional PC card ATA I/O mode interface;

FIG. 15 illustrates signal lines included in a conventional microcontroller interface; and Each of FIGS. 16A and 16B is a timing diagram illustrating a communication protocol for use in the conventional microcontroller.

DESCRIPTION OF THE PREFERRED EMBODIMENTS

Various embodiments of the present invention will now be described with reference to the accompanying drawings.

Embodiment 1

Figures 1, 2:
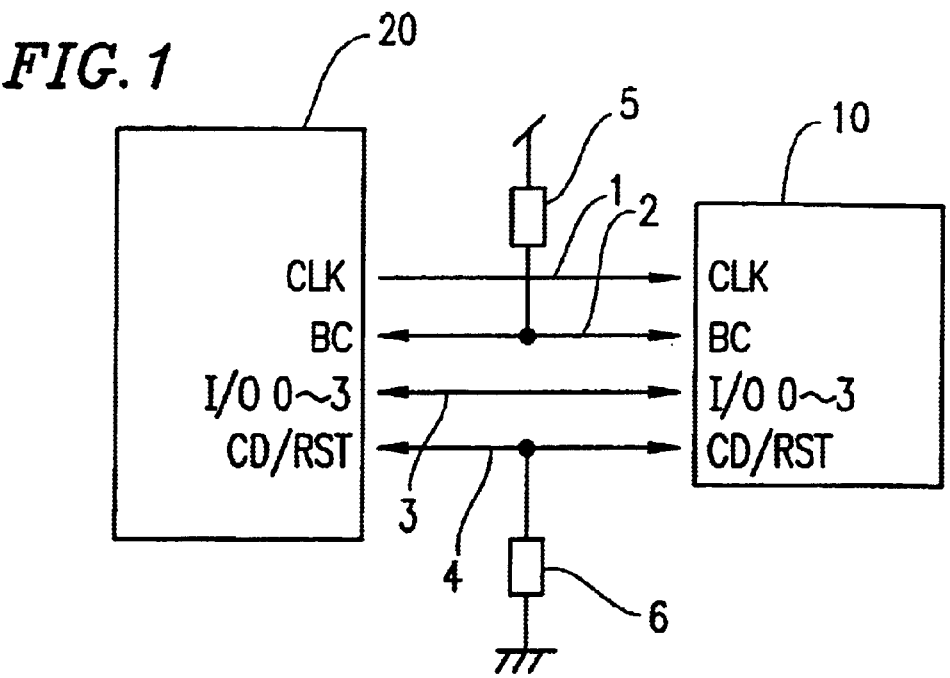
FIG. 1 is a block diagram illustrating a communication interface including a plurality of signal lines according to Embodiment 1 of the present invention.
FIG. 2 illustrates the signal lines included in the communication interface according to Embodiment 1 of the present invention.

FIG. 1 is a block diagram illustrating a communication interface including a plurality of signal lines according to Embodiment 1 of the present invention. In FIG. 1 reference numeral 20 denotes a communication master system and 10 denotes a slave system. The master system 20 inputs/outputs data to/from the slave system 10 while controlling the slave system 10. The slave system 10 outputs/inputs data from/to the master system 20 under control of the master system 20. Thus, the master system 20 and the slave system 10 communicate with each other. The communication interface includes: a clock ("CLK") signal line 1 which is connected between a CLK terminal of the master system 20 and a CLK terminal of the slave system 10; a bus control ("BC") signal line 2 which is connected between a BC terminal of the master system 20 and a BC terminal of the slave system 10 for transmitting data bus control signals therethrough; four data signal lines 3 ("I/O0"–"I/O3") which are connected between I/O0–I/O3 terminals of the master system 20 and I/O0–I/O3 terminals of the slave system 10, respectively and a slave system detection/reset ("UCD/RST") signal line 4 which is connected between a CD/RST terminal of the master system 20 and a CD/RST terminal of the slave system 10. The communication interface further includes a pull-up resistor 5 for pulling up the BC signal line 2, and a pull-down resistor 6 for pulling down the CD/RST signal line 4.

FIG. 2 illustrates the signal lines included in the communication interface according to Embodiment 1 of the present invention. Referring to FIG. 2, the communication interface includes the clock signal line 1, the SC signal line 2, the I/O0–I/O3 signal lines 3 and the CD/RST signal line 4. The clock signal is generated by the master system 20 and is used au a synchronization signal for transmission of a bus control signal BC and data signals I/O0–I/O3. The BC signal is generated by the master system 20 or the slave system 10 and is used as a signal for requesting data transmission from the master system 20 to the slave system 10, as a signal for permitting data transmission from the master system 20 to the slave system 10, and as a signal for requesting data transmission from the slave system 10 to the master system 20. The data signals I/O0–I/O3 transmitted between the master system 20 and the slave system 10 include data signals and commands transmitted from the master system 20 to the slave system 10 and data signals transmitted from the slave system 10 to the master system 20. The CD/RST signal allows the master system 20 to detect attachment/detachment of the slave system 10 and to reset the slave system 10.

The operation of the communication interface having such a configuration will now be described.

First, the communication protocol will be described.

Figure 3:
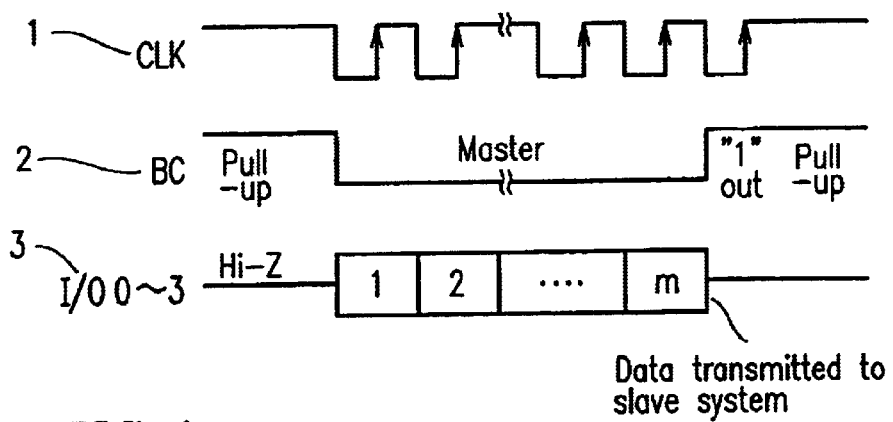
FIG. 3 is a timing diagram illustrating a communication protocol for use in communications from a master system to a slave system according to Embodiment 1 of the present invention.

FIG. 3 is a timing diagram illustrating a communication protocol for use in communications from the master system 20 to the slave system 10. In order to transmit a command or data to the slave system 10, the master system 20 controls the BC signal line 2 to go low, after which the master system 20 transmits a clock signal to the CLK signal line 1 and transmits data to the I/O0–I/O3 signal lines 3 in synchronism with a low-to-high transition of the CLK signal line 1. The slave system 10 detects a high-to-low transition of the BC signal line 2 transmitted from the master system 20 and, in synchronism with a subsequent low-to-high transition of the CLK signal 1, slave system 10 receives data from the I/O0–I/O3 signal lines 3 for m number of times. The number m is a fixed value which depends on the number of data input from the master system 20. The master system 20 activates the BC signal line 2 by setting it to a low level during the communication and deactivates the BC signal line 2 by controlling the BC signal line 2 to go high when the communication is completed. Thereafter, until the next communication is made, the SC signal line 2 is pulled up by the pull-up resistor 5.

Figure 4:
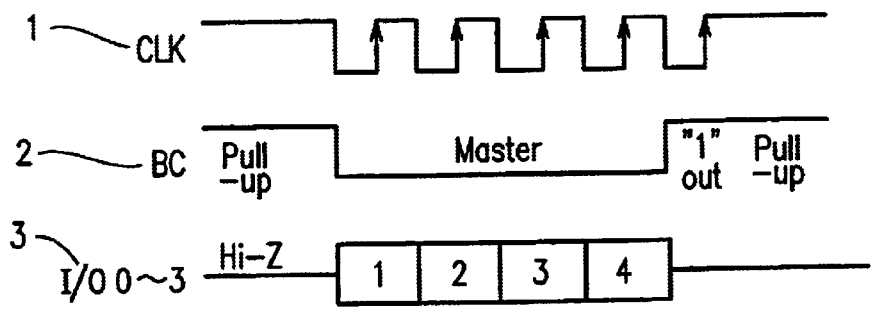
FIG. 4 is a timing diagram illustrating a communication protocol for use in a command setting operation according to Embodiment 1 of the present invention.

FIG. 4 is a timing diagram illustrating a communication protocol for use in a command setting operation according to Embodiment 1 of the present invention. In other words, FIG. 4 illustrates a communication protocol for use in transmission of commands from the master system 20 to the slave system 10. The protocol is obtained by setting the m number of times date is transmitted to 4 in the communication protocol illustrated in FIG. 3 for use in communications from the master system 20 to the slave system 10. First, the address of a register in the slave system 10 is designated during the m=1 and m=2 cycles, and data to be written to the register is input during the m=3 and m=4 cycles. Thus, an address and a command are designated during the four consecutive cycles by using the data (I/O0–I/O3) signal lines 3 according to the above command setting communication protocol. In this way, the need for an address signal line as a communication signal line is eliminated, thereby minimizing the number of communication signal lines.

Figure 5:
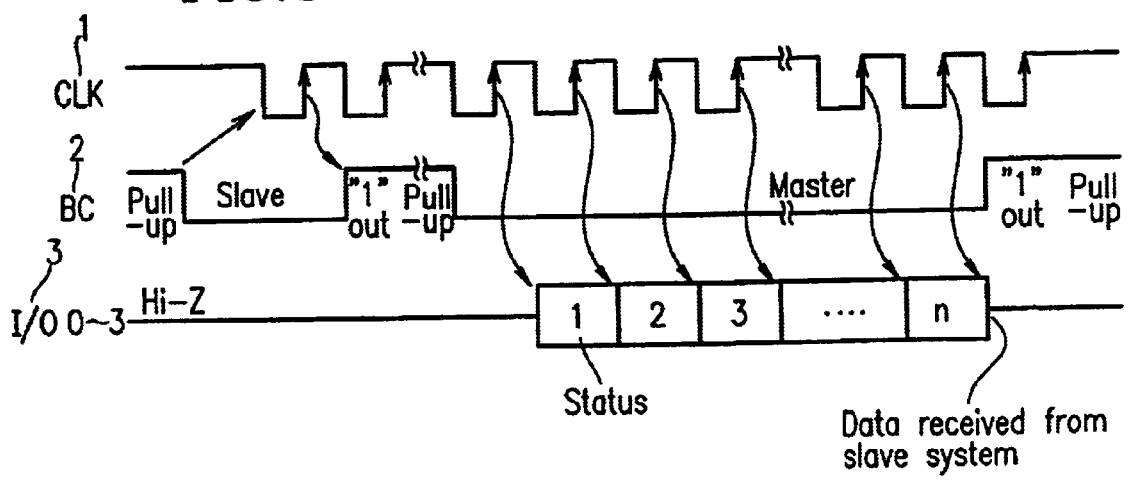
FIG. 5 is a timing diagram illustrating a communication protocol for use in communications from a slave system to a master system according to Embodiment 1 of the present invention.

FIG. 5 is a timing diagram illustrating a communication protocol for use in communications from the slave system 10 to the master system 20 according to Embodiment 1 of the present invention. In order to transmit the status or data to the master system 20, the slave system 10 controls the BC signal line 2 to go low in order to provide a transmission request signal. In response to the high-to-low transition of the BC signal line 2, the master system 20 outputs a clock signal to the CLK signal line 1. The slave system 10 controls the BC signal line 2 to go high at the rising edge of the CLK signal on the CLK signal line 1, and deactivates the BC signal line 2 at the next rising edge of the clock signal an the CLK signal line 1. Thereafter, the BC signal line 2 is kept high by the pull-up resistor 5 so that the BC signal line 2 is not activated by the master system 20 or the slave system 10. Then, the master system 20 controls the BC signal line 2 to go low, and outputs a clock signal to the CLK signal line 1. After the slave system 10 detects the high-to-low transition of the BC signal line 2, the slave system 10 transmits data to I/O0–I/O3 signal lines 3 for n number of times (a single status transmission and read data transmission for (n−1) times) in synchronism with the low-to-high transition of the CLK signal line 1. The number n is fixed to a predetermined value which depends on a command input from the master system 20. In synchronism with the low-to-high transition of the CLK signal line 1, the master system 20 receives data from the slave system 10 through the I/O0–I/O3 signal lines 3.

The master system 20 and the slave system 10 communicate with each other by using the above-described three communication protocols in combination. In the following description, a data read operation and a data write operation of the master system 20 from/to the slave system 10 will be discussed as exemplary communication operations which can be performed with the present invention assuming that the slave system 10 is a detachable memory device.

Figure 6:
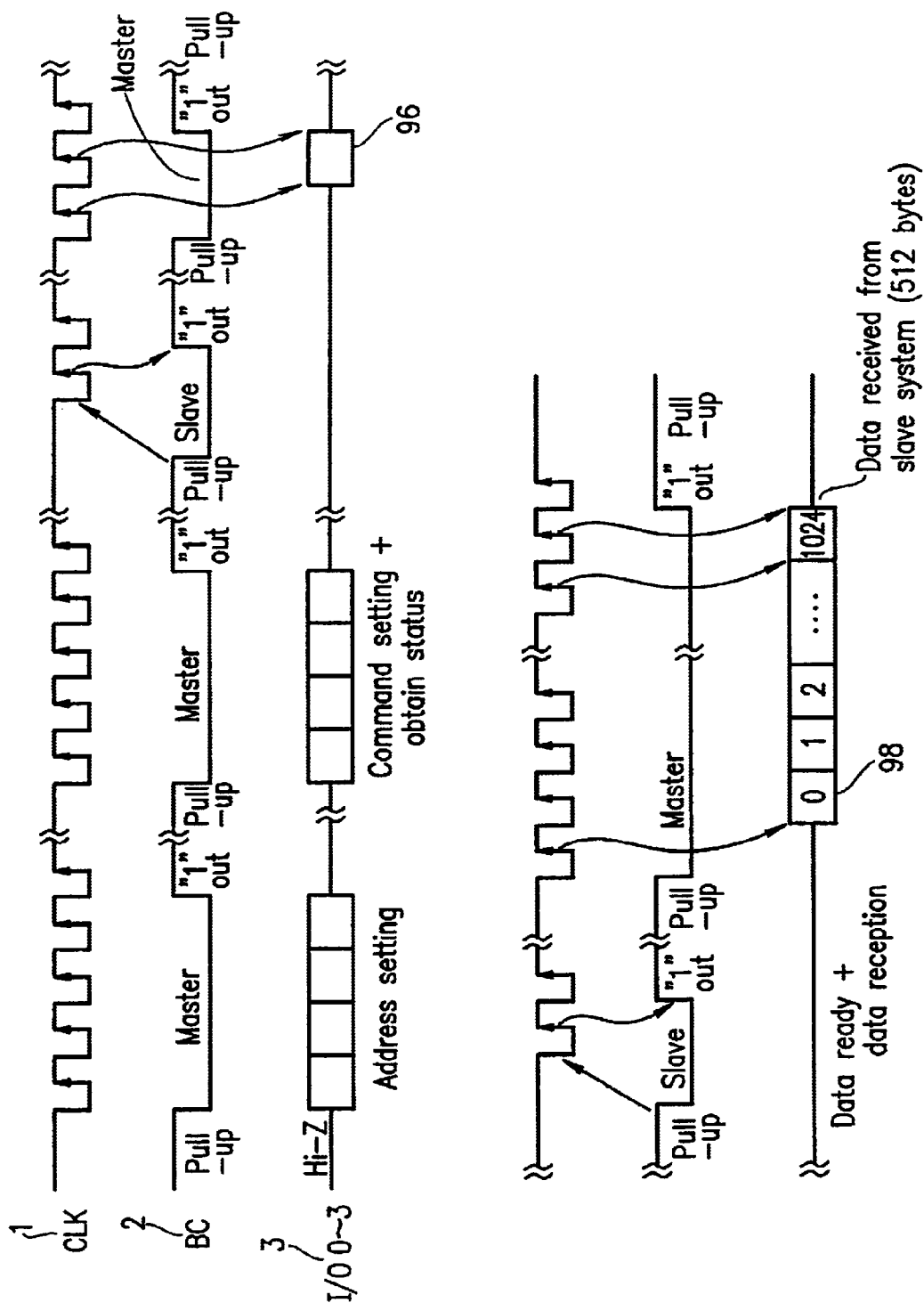
FIG. 6 is a timing diagram illustrating a communication protocol for use in a read operation according to Embodiment 1 of the present invention.

FIG. 6 is a timing diagram illustrating a communication protocol for use in a read operation according to Embodiment 1 of the present invention.

First, the master system 20 performs the command setting communication protocol as illustrated in FIG. 4, thereby setting in the slave system 10 address data at which the read operation is to be performed and thereafter transmitting a read command to the slave system 10. Then, the slave system 10 confirms that a read command has been received from the master system 20 and returns a command status which indicates whether the command is valid to the master system 20. This is done by returning status data to the master system 20 according to the communication protocol for use in communications from the slave system 10 to the master system 20 as illustrated in FIG. 5. The master system 20 determines whether the status data is normal. If so, the master system 20 goes into a stand-by state. Once the read data is ready for transmission to the master system 20, the slave system 10 performs a communication operation according to the communication protocol for use in communications from the slave system 10 to the master system 20 as illustrated in FIG. 5. Thus, when the transmission data is ready, the slave system 10 controls the BC signal line 2 to go low to notify the master system 20 of a read data transmission request. In response to this, the master system 20 transmits A clock signal to the CLK signal line 1 to notify the slave system 10 of the reception of the transmission request. In response to the clock signal, the slave system 10 firstly controls the BC signal line 2 to go high, and then deactivates the BC signal line 2. Next, the master system 20 controls the BC signal line 2 to go low and transmits a clock signal to the CLK signal line 1, thereby starting transmission of read data from the slave system 10 to the I/O0–I/O3 signal lines. For status information of the read data of the slave system 10 is assigned at the beginning of the output read data, the master system 20 can use the status information to determine whether the read data is normal data. When the status information is abnormal, the master system 20 can control the BC signal line 2 to go high to discontinue the data reception operation. According to this communication procedure, if the status of the command from the slave system 10 is normal the master system 20 does not need to monitor the state of the slave system 10 until the next high-to-low transition of the BC signal line 2 is made by the slave system 10 indicating a data transmission request. Thus, any extra communication for monitoring purposes is not necessary, thereby reducing the burden on the master system 20 to control the slave system 10. Moreover, input of the clock signal is not always necessary, thereby lowering the operating current.

FIG. 7 is a timing diagram illustrating a communication protocol for use in a write operation according to Embodiment 1 of the present invention.

First, the master system 20 sets an address in the slave system 10 at which data is to be written according to the command setting communication protocol illustrated in FIG. 4, after which the master system 20 further transmits a write command. Then, the slave system 10 confirms the write command transmitted by the master system 20, and transmits a command status to the master system 20 to indicate whether the command is valid. To do this, the slave system 10 returns a command status to the master system 20 according to the communication protocol for use in communications from the slave system 10 to the master system 20 as illustrated in FIG. 5. Moreover, when the slave system 10 has been prepared to receive write data from the master system 20, the slave system 10 executes the communication protocol for use in communications from the slave system 10 to the master system 20 an illustrated in FIG. 5, and controls the BC signal line 2 to go low to issue a write data transmission request to the master system 20. In response to this, the master system 20 transmits the write data to the slave system 10, and then goes into a stand-by state. Then, the slave system 10 writes the received data into a memory device. When the write operation is completed the slave system 10 executes the communication protocol for use in communications from the slave system 10 to the master system 20 as illustrated in FIG. 5 to transmit an execution status indicating "write operation completed" to the master system 20.

As described above, the master system 20 controls the BC signal line 2 to go low when the master system 20 transmits data, whereas the slave system 10 controls the BC signal line 2 to go low when the slave system 10 transmits data. In this way, data is transmitted between the master system 20 and the slave system 10. The above-described conventional PC card ATA I/O mode interface requires two signal lines: one for a signal which is input from the master system 20 to the slave system 10 when the master system 20 selects one of a plurality of slave systems 10; and another for a signal which is input from the slave system 10 to the master system 20 when the slave system 10 returns a response to the master system 20. On the contrary, according to the present invention, a single signal line, i.e., the BC signal line 2, functions as a two-way communication trigger signal line instead of two lines in the conventional interface, thereby reducing the number of communication signal lines.

FIG. 8 illustrates slave system status definitions according to Embodiment 1 of the present invention. In FIG. 8, reference numeral 96 denotes a command status. The slave system 10 returns the command status to the master system 20 after the slave system 10 receives a command from the master system 20 to indicate whether the command is valid for the slave system 10. Reference numeral 97 denotes a slave status which indicates a state of an operation mode of the slave system 10. Reference numeral 98 denotes an execution status which indicates the result of the execution by the slave system 10 of a command received from the master system 20.

FIG. 9 illustrates command definitions according to Embodiment 1 of the present invention. In FIG. 9, a column 91 shows command names, column 92 shows command description, columns 93 and 94 show register addresses for identifying the commands, column 95 shows data to be written in a register address designated by the register addresses shown in the columns 93 and 94, and columns 96, 97 and 98 indicate which one/ones of the command status, the slave status and the execution status as illustrated in FIG. 8 is/are to be returned to the master system 20.

Embodiment 2

FIG. 10 in a block diagram illustrating an exemplary interface connection between a master system and a plurality of slave systems according to Embodiment 2 of the present invention. In the exemplary interface connection illustrated in FIG. 10, two slave systems are connected to one master system.

In FIG. 10, reference numeral 30 denotes a master system which controls a slave system for inputting/outputting data to/from the slave system. The master system 30 includes nine terminals: CLK, BC0, BC1, I/O0–I/O3, CD/RST0 and CD/RST1. Reference numeral 31 denotes a first slave system (0) which is controlled by the master system 30 to input/output data. The first slave system (0) 31 includes seven terminals: CLK, BC, I/O0–I/O3 and CD/RST. Reference numeral 32 denotes a second slave system (1) which is also controlled by the master system 30 to input/output data. The slave system (1) 32 also includes seven terminals: CLK, BC, I/O0–I/O3 and CD/RST. Reference numeral 41 denotes a CLK signal line for connecting the CLK terminal of the master system 30 with the clock terminals of the slave systems (0) 31 and (1) 32. Reference numeral 42 denotes a BC0 signal line for connecting the BC0 terminal of the master system 30 with the BC terminal of the slave system (0) 31. Reference numeral 52 denotes a BC1 signal line for connecting the BC1 terminal of the master system 30 with the BC terminal of the slave system (1) 32. Reference numeral 33 denotes a 4-bit I/O0–I/O3 signal linen for connecting the I/O0–I/O3 terminals of the master system 30 with the I/O0–I/O3 terminals of the slave systems (0) 31 and (1) 32, respectively. Reference numeral 44 denotes a CD/RST0 signal line for connecting the CD/RST0 terminal of the master system 30 with the CD/RST terminal of the slave system (0) 31. Reference numeral 54 denotes n CD/RST1 signal line for connecting the CD/RST1 terminal of the master system 30 with the CD/RST terminal of the slave system (1) 32. Reference numeral 45 denotes a pull-up resistor for pulling up the BC0 signal line 42. Reference numeral 46 denotes a pull-down resistor for pulling down the CD/RST0 signal line 44. Reference numeral 55 denotes a pull-up resistor for pulling up the BC1 signal line 52. And reference numeral 56 denotes a pull-down resistor for pulling down the CD/RST1 signal line 54.

The operation of a communication circuit having such a configuration will now be described.

Figure 11:
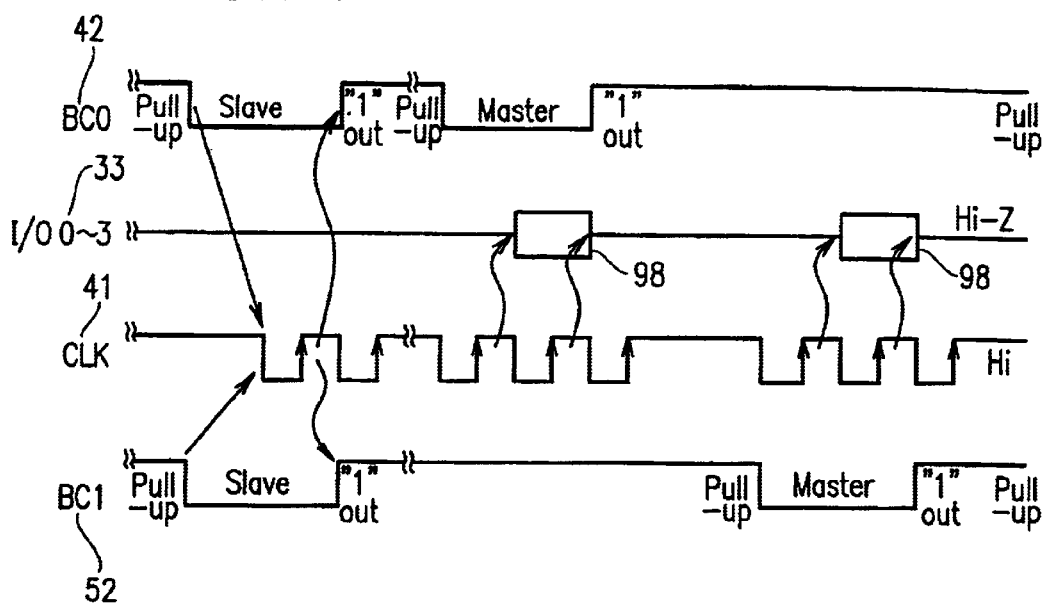
FIG. 11 is a timing diagram illustrating a communication protocol for use in a write operation according to Embodiment 2 of the present invention where a plurality of slave systems are included.

FIG. 11 is a timing diagram illustrating a communication protocol for use in a write operation according to Embodiment 2 of the present invention where a plurality of slave systems are included in the present embodiment, a case where the master system 30 simultaneously performs write operation to the respective slave systems 31 and 32 will be described.

The address setting operation, the command setting operation and the write data transmission operation to the two slave systems 31 and 32 can be performed in a manner similar to that in Embodiment 1 by shifting the timings when the master system 30 performs these operations to the slave systems 31 and 32 from each other. It is assumed that after the slave systems 31 and 32 complete the respective write operations, the slave systems 31 and 32 issue respective execution status transmission requests to the master system 30 with the same timing. In such a case, the master system 30 can perform a competition arbitration so as to preferentially communicate with one of the slave systems 31 or 32. For example, when the master system 30 is to preferentially communicate with the slave system (0) 31, the master system 30 controls the BC0 signal line 42, which is connected to the slave system (0) 31, to go low, and inputs a clock signal to the CLK signal line 41. In response to the clock input, the slave system (0) 31 outputs data to the I/O0–I/O3 signal lines 33. The slave system (0) 31 detects a high-to-low transition of the BC0 signal line 42 made by the master system 30, and then transmits an execution status to the I/O0–I/O3 signal lines 33 in synchronism with the low-to-high transition of the CLK signal line 41. Upon reception of the execution status, the master system 30 knows that a write operation has been performed by the slave system (0) 31. During this operation the slave system (1) 32 does not operate even if a signal is input from the CLK signal line 41 because the BC1 signal line 52 is kept high by the pull-up register 55.

Then, the master system 30 controls the BC1 signal line 52 to go low, and inputs a clock signal to the CLK signal line 41. In response to the clock input, the slave system (1) 32 outputs data to the I/O0–I/O3 signal lines 33. The slave system (1) 32 detects a high-to-low transition of the BC1 signal line 52 made by the master system 30, and then transmits an execution status to the I/O0–I/O3 signal lines 33 in synchronism with the low-to-high transition of the CLK signal line 41. Upon reception of the execution status, the master system 30 knows that a write operation has been performed by the slave system (1) 32.

As described above, even when the master system 30 simultaneously receives communication requests from two slave systems, the master system 30 can perform time-division communication to the slave systems by preferentially communicating with one of the slave systems while keeping the other slave system waiting.

When transmission requests are issued from the slave systems with different timings, the requests can be processed in a manner as described above for Embodiment 1.

Although a case where there are two slave systems has been illustrated in Embodiment 2 the operation of Embodiment 2 can similarly be used where there are three or more slave systems.

In Embodiments 1 and 2 after the master system or the slave system controls the BC signal line to go low and communicates with the slave system or the master system, respectively, the master system or the slave system controls the BC signal line to go high. Alternatively, the BC signal line can be kept high by using the pull-up resistor connected to the BC line, without controlling the BC signal line to go high.

In Embodiments 1 and 2, the master system and the slave system communicate with each other in synchronism with a low-to-high transition of a clock signal. Alternatively, the master system and the slave system may communicate with each other in synchronism with a high-to-low transition of the clock signal.

Embodiment 3

Next, a slave system detection operation and a slave system reset operation of a communication interface of the present invention will be described.

Figure 12:
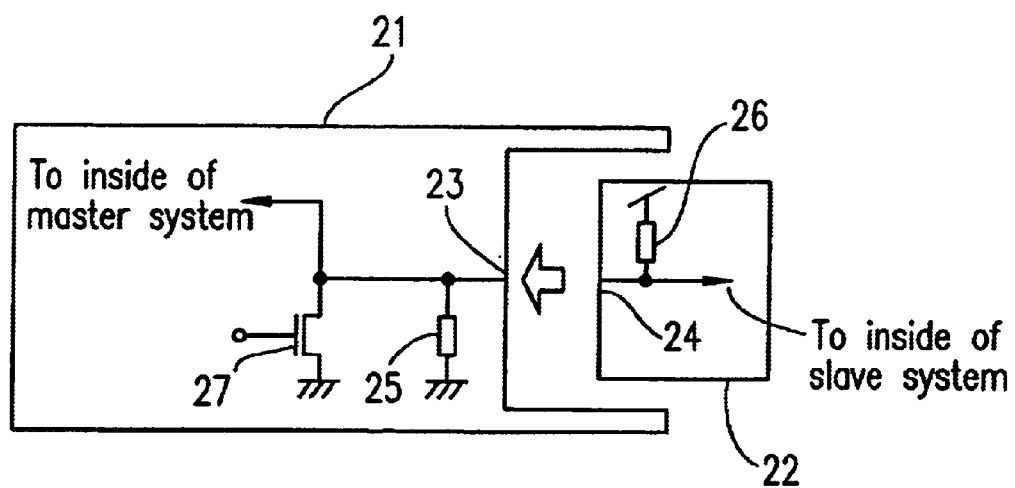
FIG. 12 illustrates a slave system detection function and a slave system reset function according to Embodiment 3 of the present invention.

FIG. 12 illustrates a slave system detection function and a slave system reset function according to Embodiment 3 of the present invention.

In FIG. 12, reference numeral 21 denotes a master system, 22 denotes a slave system, 23 denotes a CD/RST terminal of the master system 21, and 24 denotes a CD/RST terminal of the slave system 22. The CD/RST terminal 23 of the master system 21 and the CD/RST terminal 24 of the slave system 22 are short-circuited with each other when the slave system 22 is connected to the master system 21. Reference numeral 25 denotes a pull-down resistor connected to the CD/RST terminal 23 of the master system 21. Reference numeral 26 denotes a pull-up resistor connected to the CD/RST terminal 24 of the slave system 22. Reference numeral 27 denotes a reset transistor of the slave system 22. The pull-down resistor 25 and the pull-up resistor 26 are designed to have a resistance ratio of about 10:1 so that when the CD/RST terminal 23 of the master system 21 and the CD/RST terminal 24 of the slave system 22 are short-circuited with each other, the CD/RST terminal will be at a high level.

When the slave system 22 is connected to the master system 21, the CD/RST terminal 23 of the master system 21 transition from a low level to a high level. By this transition, the master system 21 can detect whether the slave system 22 has been connected to the master system 21 in order to start transmitting/receiving an operation to/from the slave system 22. The transistor 27 provided on the master system 21 side is a transistor for resetting a slave system. An ON resistor of the transistor 27 is set to a resistance value which is sufficiently lower than that of the pull-up resistor 26 provided in the slave system 22. Moreover, the slave system 22 is designed so that the slave system 22 is reset or initialized when the CD/RST terminal 24 goes low. In a communication system with such settings, after the slave system 22 is connected to, and detected by, the master system 21, the transistor 27 can be turned ON to perform an initialization of the slave system 22. If any abnormality occurs during communication between the master system 21 and the slave system 22, the transistor 27 can be turned ON to initialize the slave system 22. Each of the CD/RST terminals 23 and 24 both nave a slave system detection function and a slave system reset function. Thus, the number of signal lines required is reduced.

In Embodiment 3 of the present invention, the CD/RST terminal is produced by providing the pull-down resistor 25 and the pull-down transistor 27 in the master system 21 and providing the pull-up resistor 26 in the slave system 22.

Alternatively, the CD/RST terminal may be produced by providing a pull-up resistor and a pull-up transistor in the master system 21 and providing a pull-down resistor in the slave system 22.

As described above, the present invention provides a communication interface which employs a bus control (BC) signal line which is used for both a transmission signal from the master system to the slave system and for a response signal from the slave system to the master system, wherein the master system transmits a clock signal only when the BC signal line is activated by the master system or the slave system, and the master system stops transmitting the clock signal while the BC signal line is not activated. The communication interface further includes a CD/RST signal line which is used by the master system both for a slave system initialization signal and a slave system detection signal. Thus, the present invention provides a communication interface in which the number of communication signal lines between the master system and the slave system is minimized even when a plurality of slave systems are used while suppressing the amount of power consumed during the communication.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A communication interface, comprising a clock signal line, a first signal line, a second signal line and one or more data signal lines as communication signal lines between a master system and a slave system, wherein:

the master system transmits a clock signal to the clock signal line after the slave system has activated the first signal line;

the master system stops transmitting the signal to the clock signal line after the slave system stops activation of the first signal line;

after a predetermined period of time has passed after the master system has stopped transmitting the clock signal to the clock signal line, the master system activates the first signal line and transmits the clock signal to the clock signal line;

the master system and the slave system communicate with each other via the one or more data signal lines in synchronism with the clock signal on the clock signal line; and after the communication is completed, the master system stops activation of the first signal line while simultaneously stopping transmission of the clock signal to the clock signal line.

2. A communication interface according to claim 1, wherein the a second signal line is used both for transmitting an initialization signal from the master system to the slave system and for transmitting a detection signal from the slave system to the master system.

3. A communication interface according to claim 1, wherein the first signal line is connected to a first predetermined potential via a first resistor element.

4. A communication interface according to claim 1, wherein the second signal line is connected to a predetermined potential via a second resistor element.

* * * * *